(No Model.) 2 Sheets—Sheet 1.

K. MILLER.
PLUMB LEVEL.

No. 441,772. Patented Dec. 2, 1890.

WITNESSES:

INVENTOR:
Karl Miller,
BY Fred. C. Fraentzel, ATTY.

(No Model.) 2 Sheets—Sheet 2.

K. MILLER.
PLUMB LEVEL.

No. 441,772. Patented Dec. 2, 1890.

WITNESSES:

INVENTOR:
Karl Miller.
BY Fred. C. Fraentzel, ATTY.

UNITED STATES PATENT OFFICE.

KARL MILLER, OF NEWARK, NEW JERSEY.

PLUMB-LEVEL.

SPECIFICATION forming part of Letters Patent No. 441,772, dated December 2, 1890.

Application filed June 5, 1890. Serial No. 354,333. (No model.)

*To all whom it may concern:*

Be it known that I, KARL MILLER, a subject of the Emperor of Germany, residing at Newark, in the county of Essex and State of New Jersey, have invented certain new and useful Improvements in Combined Levels and Plumbs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide a combined level and plumb which serves for the same purpose as an ordinary spirit-level, and which at all times under all conditions is perfectly true and correct.

The invention is illustrated in the accompanying drawings, in which—

Figure 1:
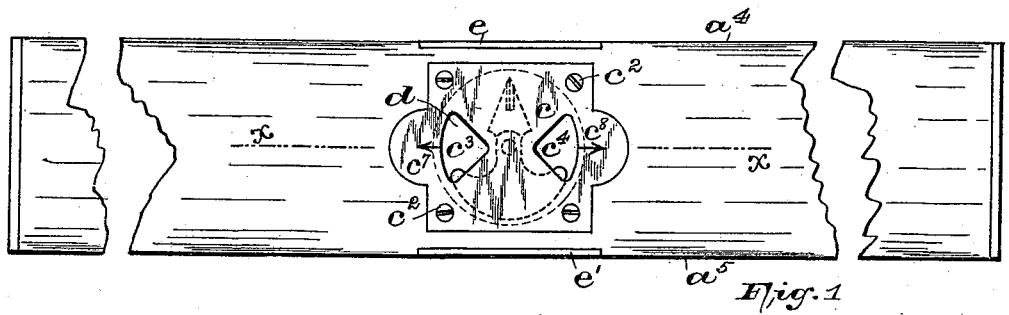
Figure 2:
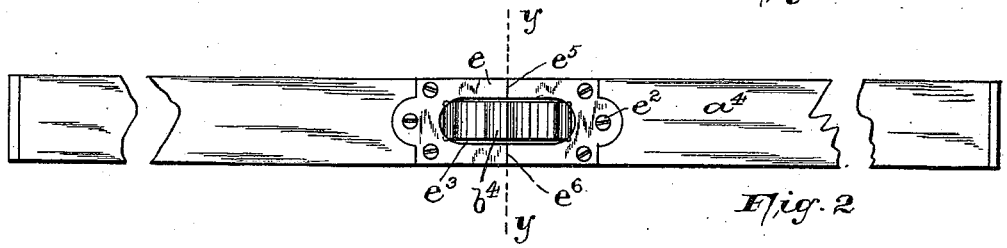
Figure 3:
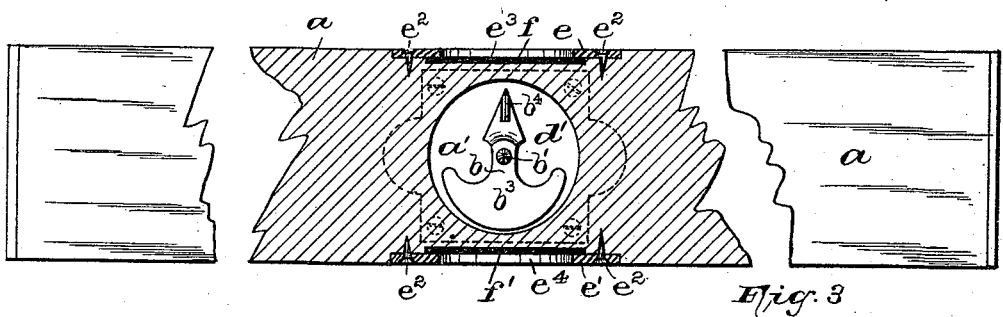
Figures 4, 5, 6:
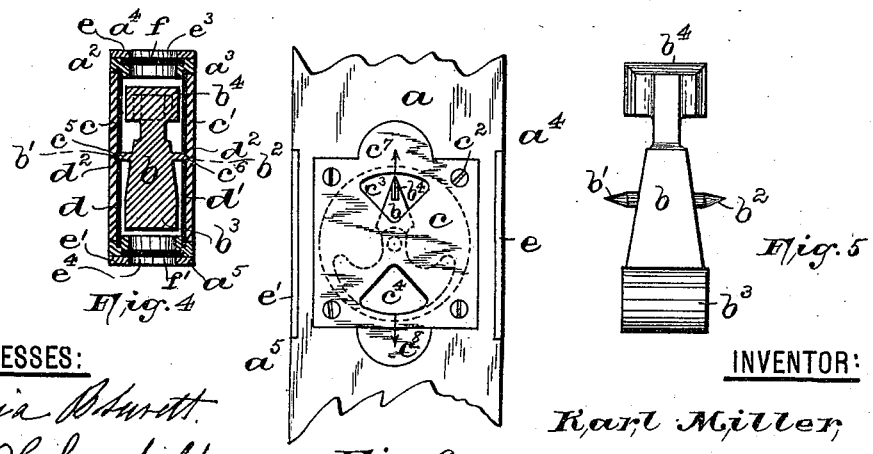

Figure 1 is a side elevation of the level provided with a revolving index, whereby the same can be used on both sides as a level and at both ends as a plumb. Fig. 2 is a top view of the same. Fig. 3 is a longitudinal section of the level shown in Fig. 1, and Fig. 4 is a vertical section taken through line $y$ in Fig. 2. Fig. 5 is an end elevation of the leveling device or index; and Fig. 6 illustrates the position of the index pointing in the direction of line $x\,x$, shown in Fig. 1, when the level is held in a vertical position and can thereby be used as a plumb.

Figure 7:
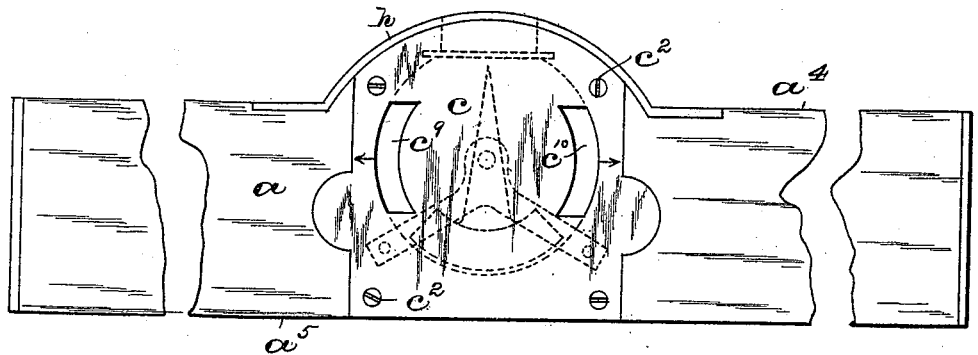

On Sheet 2 is illustrated a modified form of construction of the leveling device or index. On said sheet, Fig. 7 is a side elevation, Fig. 8 a top view; and Fig. 9 represents a vertical section of this modified form of construction.

Similar letters of reference are employed in each of the several views to indicate corresponding parts.

In said figures, $a$ indicates the body portion of the combined level and plumb, which may be of wood or any other suitable material. Said body portion is provided with a centrally-arranged hole $a'$, forming a chamber in which is arranged the leveling device or index $b$, in the manner as will be described hereinafter.

In the opposite sides $a^2$ and $a^3$ of the body portion $a$ are mortised the plates $c$ and $c'$, preferably of brass, covering the hole $a'$ and flush with the surfaces or sides $a^2$ and $a^3$, being secured therein by means of pins or screws $c^2$. Directly behind the plates $c$ and $c'$, which are provided with openings $c^3$ and $c^4$, are secured or arranged glass plates $d$ and $d'$. In the upper side $a^4$ and in the under side $a^5$ are countersunk flush with said surfaces the metallic plates $e$ and $e'$, secured thereto by means of pins or screws $e^2$. Said plates $e$ and $e'$ are also provided with openings $e^3$ and $e^4$, respectively, and behind the plates are arranged the glass plates $f$ and $f'$. The glass plates $d$ and $d'$ are perforated at $d^2$, and directly behind said perforation $d^2$ the plates $c$ and $c'$ are provided with indentations $c^5$ and $c^6$, which form bearings for the pivoted pins $b'$ and $b^2$ on the index. Said index $b$ is provided with a weighted or heavy end $b^3$, while at its upper end it is furnished with a pointed index-hand $b^4$, as will be clearly seen from Fig. 5.

When the leveling device or index $b$ has been hung by means of the journal-pins $b'$ and $b^2$ in the bearings $c^5$ and $c^6$, it can freely swing about its axis, passing through said pins within the chamber formed in the body portion of the level, and the index-hand $b^4$ will always point upwardly in the vertical plane passing through the pointed end of the index-hand and through the central axis of the pins $b'$ and $b^2$. Thus when the device is used as a level either side $a^4$ and $a^5$ can be used, and when the body portion $a$ rests upon a perfectly-level surface the pointed end of the index-hand $b^4$ will be in the same vertical plane passing through the two marks $e^5$ and $e^6$, marked upon said plates $e$ and $e'$ directly across the inner axis of the openings in said plates, as is clearly shown in Figs. 1, 2, and 3.

When it is desired to use the device as a plumb, either side $a^4$ or $a^5$ is placed against the work and the weighted index $b$ rotates upon its axis, and if the work is perfectly plumb the index $b^4$ will register with marks $c^7$ or $c^8$ above the openings $c^3$ and $c^4$ in said plate, the pointed end of the index being plainly visible through the glass arranged behind said openings. Thus it will be seen that the device can be used on all sides either as a level or a plumb and can be more conveniently handled than the level now in use.

On Sheet 2 a device is shown in which the leveling device $b$ is pivoted above the longitudinal central axis of the body portion $a$, and in which case the side $a^5$ can only be employed in using the tool. In this construction the index $b$ is pivotally secured in bearings in the frame $g$, as shown more especially in Fig. 9, and the plates $c$ and $c'$ are provided with openings $c^9$ and $c^{10}$, as shown. A curved plate $h$ is secured to the upper side of the level and provided with a perforation $h'$, across which is arranged a glass plate $i$.

Figure 8:
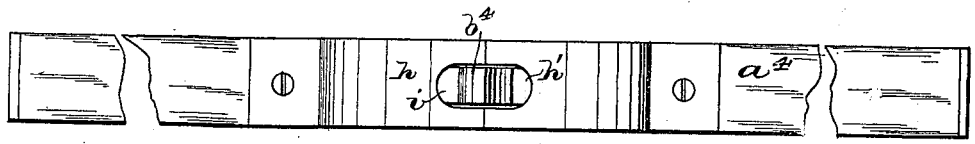
Figure 9:
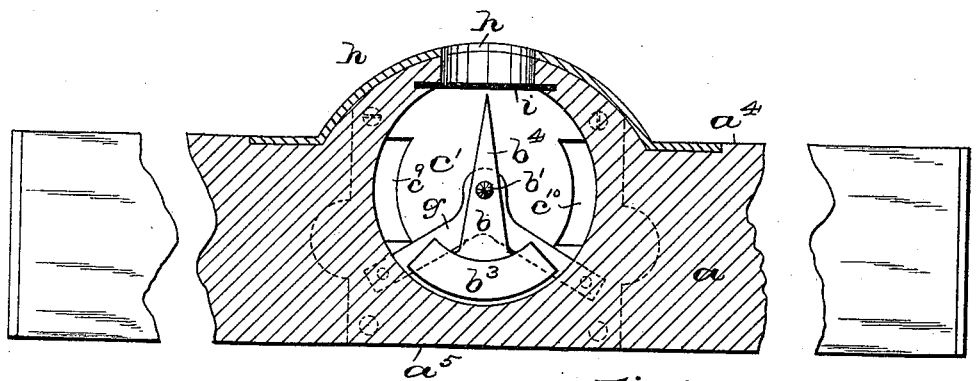

From Figs. 7 and 8 the manner of using the tool will be evident, the index-hand registering in precisely the same manner as has been described above.

The advantages obtained in these constructions over the common spirit-level are, first, that the workman can gage more correctly the pointed index-hand, which is always true, registering with the lines on plates, and, furthermore, there is no danger from the freezing of the water or spirit used in the ordinary level. In these levels it very often happens that the spirit-tube becomes broken and the liquid escapes, when the level becomes useless. This is not so in the present construction. Should any of the glasses become broken, the index-hand will still register with the marks on the plates, and the glass plates can readily be replaced.

Having thus described my invention, what I claim is—

The herein-described combined plumb and level, consisting of a chambered body portion $a$, plates $c$ and $c'$, provided with oppositely-arranged openings, secured to the sides $a^2$ and $a^3$ of the body portion, plates $e$ and $e'$, also provided with openings, secured to the sides $a^4$ and $a^5$, and a leveling device or index having a pointed end $b^4$ and weighted at $b^3$, provided with pins or journals $b'$ and $b^2$, adapted to rotate in bearings in said plates $c$ and $c'$, as and for the purposes set forth.

In testimony that I claim the invention set forth above I have hereunto set my hand this 4th day of June, 1890.

KARL MILLER.

Witnesses:
 FREDK. C. FRAENTZEL,
 WM. H. CAMFIELD.